(12) United States Patent
Rogozhkin et al.

(10) Patent No.: US 11,984,234 B2
(45) Date of Patent: May 14, 2024

(54) CONDENSATE SYSTEM FOR RECUPERATING ENERGY FROM A NUCLEAR POWER PLANT

(71) Applicants: JOINT-STOCK COMPANY SCIENTIFIC RESEARCH AND DESIGN INSTITUTE FOR ENERGY TECHNOLOGIES ATOMPROEKT, St.Petersburg (RU); JOINT-STOCK COMPANY "ATOMENERGOPROEKT", Moscow (RU); JOINT STOCK COMPANY "SCIENCE AND INNOVATIONS", Moscow (RU)

(72) Inventors: Vladimir Vladimirovich Rogozhkin, St.Petersburg (RU); Igor Aleksandrovich Tkhor, St.Petersburg (RU); Nikolay Aleksandrovich Prohorov, St.Petersburg (RU); Vladislav Feliksovich Kosarev, St.Petersburg (RU); Kirill Vladimirovich Moshkov, St.Petersburg (RU); Aleksey Vyacheslavovich Shevoldin, St.Petersburg (RU); Vyacheslav Andreyevich Skachkov, Moscow (RU); Yevgeniy Borisovich Mishin, Mytishchi Moskovskaya obl. (RU)

(73) Assignees: Joint-Stock Company "Atomenergoproekt", Moscow (RU); Joint-Stock Company Scientific Research and Design Institute for Energy Technologies Atomproekt, St. Petersburg (RU); Joint Stock Company "Science and Innovations", Moscow (RU)

( * ) Notice: Subject to any disclaimer, the term of this patent is extended or adjusted under 35 U.S.C. 154(b) by 260 days.

(21) Appl. No.: 16/959,091
(22) PCT Filed: Dec. 29, 2017
(86) PCT No.: PCT/RU2017/001008
§ 371 (c)(1),
(2) Date: Jun. 29, 2020
(87) PCT Pub. No.: WO2019/132703
PCT Pub. Date: Jul. 4, 2019

(65) Prior Publication Data
US 2020/0335235 A1 Oct. 22, 2020

(51) Int. Cl.
*G21D 1/02* (2006.01)
*G21D 1/04* (2006.01)
*E03B 3/28* (2006.01)

(52) U.S. Cl.
CPC ............... *G21D 1/02* (2013.01); *G21D 1/04* (2013.01); *E03B 3/28* (2013.01)

(58) Field of Classification Search
CPC . G21D 1/04; G21D 1/02; G21C 15/26; B01D 3/007; B01D 3/205; B01F 3/04468;
(Continued)

(56) References Cited

U.S. PATENT DOCUMENTS

2005/0279713 A1* 12/2005 Osborn ................. B01F 5/0498
210/760
2010/0065250 A1* 3/2010 Frommann ............. F28F 13/06
165/95

FOREIGN PATENT DOCUMENTS

DE 102012213489 A1 * 2/2014 .......... G21C 15/182
FR 1205566 A * 2/1960
(Continued)

OTHER PUBLICATIONS

Ryther, John H., et al. Nuclear power plant waste heat utilization. No. COO-2869-1. Kramer, Chin, and Mayo, Inc., Seattle, WA (USA), 1977. (Year: 1977).*
(Continued)

*Primary Examiner* — Sharon M Davis
(74) *Attorney, Agent, or Firm* — J. Miguel Hernandez; James R. Gourley; Carstens, Allen & Gourley, LLP

(57) ABSTRACT

A condensation system for recuperating energy discharge of a nuclear power plant comprises a nuclear power unit, a compressor, a condenser, a water chamber equipped with a sprinkler, an electrical current generator, a pure water pump station, a cooling water pump station, a secondary condensate pool and a turboexpander. The compressor is connected to the condenser, which is connected to the turboexpander, which is supplied with the electric current generator and is connected to the water chamber, which is connected to the secondary condensate pool, which is connected to the pure water pump station, the condenser being connected to the cooling water pump station, wherein the compressor is connected by a pressure air duct to a wastewater channel, which is connected to the nuclear power unit and is equipped with a sealing cover.

7 Claims, 2 Drawing Sheets

(58) Field of Classification Search
CPC ... B01F 3/04106; C02F 1/048; F28D 21/0012
See application file for complete search history.

(56) References Cited

FOREIGN PATENT DOCUMENTS

| | | | |
|---|---|---|---|
| RU | 2504417 C1 * | 1/2014 | |
| WO | WO-2016004014 A1 * | 1/2016 | ............ B01D 47/10 |

OTHER PUBLICATIONS

Collins English Dictionary, "air intake" definition, https://www.collinsdictionary.com/dictionary/english/air-intake, last accessed Feb. 28, 2022 (5 pages).

* cited by examiner

CONDENSATE SYSTEM FOR RECUPERATING ENERGY FROM A NUCLEAR POWER PLANT

FIELD OF THE INVENTION

The invention relates to nuclear power engineering, in particular to systems for recuperating energy discharge of nuclear power plants using thermal energy and air humidity above the water surface of the wastewater channel of the nuclear power plant.

BACKGROUND OF THE INVENTION

It is known that under the condition of trouble-free operation of a nuclear power station (NPP) the direct negative impact on the environment is considerably less than that of thermal power plants (TPPs), since for the latter there is an unavoidable emission of combustion products of fuel (coal, natural gas, fuel oil, peat, combustible shales) into the atmosphere. The only factor in which the NPPs are inferior to the ecological balance of the TPP is the thermal contamination caused by the large flow rates of wastewater used for cooling of the turbine condensers, which is somewhat higher in the NPP due to the lower coefficient of performance (COP; not more than 35%). In the case where the cooling water is taken from natural water resources (rivers, lakes or seas), which from the economical point of view is economically advantageous for the NPP, this leads to an increase in the temperature of the water resources and is detrimental for the biogeocenosis. In order to combat this factor, modern NPPs are provided with their own artificially designed water reservoirs-coolers, cooling towers or spray basins. However, this does not completely solve the problem because the increased evaporation of these units into the atmosphere changes the ecological environment of the region towards an increase in temperature in conjunction with an increase in humidity, increase of precipitation, appearance of additional cloudiness, etc.

In addition, the utilization of excessive thermal emissions of the NPP can increase the COP of the NPP due to the possibility of obtaining not only electric power but also an additional economic effect. In cold regions in the winter period the utilization of the heat of the wastewater of an NPP and a TPP makes it possible to provide heating to a large number of residential and industrial premises. However, in general, this solution is not applicable. In arid coast regions where NPPs are frequently located, in view of the possibility of using large volumes of sea water as cooling water, it is possible to use the power of the NPP for producing freshwater, for which various technical solutions have been applied.

Known is a device for a mass production of freshwater by condensation of water vapors from air (patent of Russian Federation No 2143033, publ. 20 Dec. 1999) comprising a heat-insulated refrigerating chamber, a pump-compressor for sucking air from the environment into the refrigerating chamber having a pipe for discharging dehydrated cooled air from the chamber, electric heaters for melting the ice produced by condensing water vapors from air, a reservoir for a collection of formed water with a tap and a pipe for discharging water to the outside, the pump-compressor being connected to a coiled heat exchanger, which in its turn is connected to a nozzle, and the refrigerating chamber is by mean of a pipe connected to a chamber separator, where electric heaters and a pipe with a tap are located for discharging produced water to the outside. The device is designed for the production of water from atmospheric moisture by freezing of steam using compressed air, its cooling and adiabatic expansion. The obtained fine ice crystals are periodically melted by electrical heating with a discharge of water through a tap.

The disadvantages of such a device are the low quality of the obtained water, since there is no separation of non-freezing droplets and solid impurities (salt solutions, sand, etc.), a low cooling rate of compressed air with the help of external air, and also a low productivity with respect to the end product due to the periodicity of thawing. The above-mentioned disadvantages do not make it possible to expect a reduction of the effect of the wastewater on the environment in the case of its application in the nuclear industry.

The closest analogue of the claimed invention is a nuclear power complex (RU patent No. 2504417, publ. 20 Jan. 2009) which predominantly is designed for producing freshwater by condensing water vapor from atmospheric air, including an air intake means, a compressor connected to a heat-exchanging device for cooling compressed air, a turbo expander, means for transporting water and air with an armature, a nuclear power plant, wherein the air intake means is in the form of a tower having a height of at least 200 m with air intake ports arranged over the height of the tower, the heat-exchanging device for cooling the compressed air is a condenser which is connected to a droplet separator, both of which are mounted with the possibility of discharging condensate into a pool of the primary condensate, and the turbo expander is connected to the water chamber equipped with a sprinkler connected to a pool of a secondary condensate and a wastewater heat exchanger, which is connected to a nuclear power plant.

During operation of the nuclear power complex, water vapors from atmospheric air pass through an air intake means and a compressor, then pass a first condensation stage with cooling in a condenser, which makes it possible to obtain a primary condensate corresponding with respect to its ecological qualities to rain water. Then, in a second condensation stage, the compressed air passes through a turbo expander where it performs work due to a sharp adiabatic expansion with a temperature drop, so that the moisture contained therein is frozen/condensed to produce a secondary condensate the quality of which corresponds to the natural melt/rain water.

Thus, due to the use of the same processes which in nature lead to the appearance of rain water (low-temperature evaporation under the action of solar radiation and cryogenic freezing of moisture), the nuclear power complex according to the Russian federation patent No 2504417 makes it possible to obtain an ecologically pure freshwater condensate from atmospheric seawater moisture in large volumes. The disadvantages of the method, however, are (1) an insufficient productivity of the process of the production of freshwater when the nuclear power complex is located far away from the sea shore and a dependence of the productivity of the process of the production of freshwater from the daily and seasonal changes of the temperature of the surrounding air, and also (2) the insufficient coefficient of performance of the heat utilization of the NPP, and (3) the impossibility to reduce the negative effect of the thermal discharge of the wastewater of the NPP on the environment.

The object of the present invention is to provide the design of a condensate system of a wastewater channel of a nuclear power plant that provides: (1) a high productivity of the process of producing freshwater under any conditions due to recuperation of the thermal energy of the water of the wastewater channel of the NPP by utilizing its moist high-temperature steam, and also (2) an increase of the total coefficient of performance with respect to the heat in the NPP and (3) a reduction of the negative effect of the heat of the wastewater on the environment.

The technical result of the present invention is: (1) ensuring a high productivity of the process of producing freshwater under any conditions due to the recuperation of the thermal energy of the water of the wastewater channel of the NPP by utilizing its moist high-temperature steam, and also (2) increasing the general coefficient of the heat utilization of the NPP and (3) reducing the negative effect of the wastewater on the environment.

The technical result is achieved in that in the known (patent of the Russian Federation No. 2504417) condensate system of a nuclear power station for condensing water vapors from atmospheric air, which includes a nuclear power plant, a compressor, a condenser, a water chamber provided with a sprinkler, an electric current generator, a pure water pumping station, a cooling water pumping station, a secondary condensate pool and a turbo expander, the compressor connected to a condenser connected to a turbo expander, which is provided with an electric current generator and is connected to a water chamber which is connected to a secondary condensate pool, the secondary condensate pool being connected to the pump station of pure water, the condenser being connected to the pump station of cooling water, wherein all of the connections being made in the form of pressure lines, and wherein as characterizing feature the compressor is connected by a pressure air duct to the wastewater channel of the NPP, which is connected to the nuclear power plant, and the wastewater channel is provided with a sealed roof.

Preferably, the wastewater channel is provided with bubbling tubes arranged below the surface of the wastewater and connected by air ducts with the water chamber.

It is expedient to make the wastewater channel with an effective area of not less than 2000 m$^2$ per every 100 m of length.

It is recommended to provide a condensate system with a droplet separator and a primary condensate pool, the condenser being connected by a pressure line with the droplet separator connected to the turbo expander and a primary condensate pool connected to the water chamber sprinkler and the pure water pump station.

It is preferred to provide an air duct connecting the water chamber with the bubbling tubes, a bubbling compressor.

It is expedient to connect the pump station of cooling water by a pressure pipe with the wastewater channel below the bubbling tubes, and to connect the compressor by means of a pressure pipe with the wastewater channel of wastewater above the bubbling tubes.

It is recommended to connect the pump station of the cooling water and the condenser to an external heating system (NPP, industrial plant, populated places, etc.).

It is preferable to connect the sprinkler of the water chamber with a pressure pipe with the pool of the secondary condensate.

It is expedient to arrange parts of the air ducts, which are located in the wastewater channel of the wastewater, above the surface of the wastewater and to provide them with ducts having the possibility of collecting condensate and being connected to the pipes for discharging condensate outside the wastewater channel.

The advantages of the present invention are: the provision of a high productivity of the process of producing freshwater under any conditions due to the recuperation of the thermal energy of the water of the wastewater channel of the NPP by utilizing its moist high-temperature steam, the increase of the total heat utilization factor of the NPP and the reduction of the negative effect of the wastewater on the environment.

The connection of the condenser with the wastewater channel of the NPP, in which there are bubbling tubes below the water surface, connected by an air duct to the water chamber, as well as the introduction of the air-tight roof of the wastewater channel makes it possible to ensure the withdrawal of moist steam from the water of the wastewater channel of the NPP and thereby to provide a high productivity of the process of producing freshwater under any conditions, to reduce the temperature of the wastewater and the negative effect on the environment and also to make it possible to increase the total heat utilization factor of the NPP.

Figure 1:
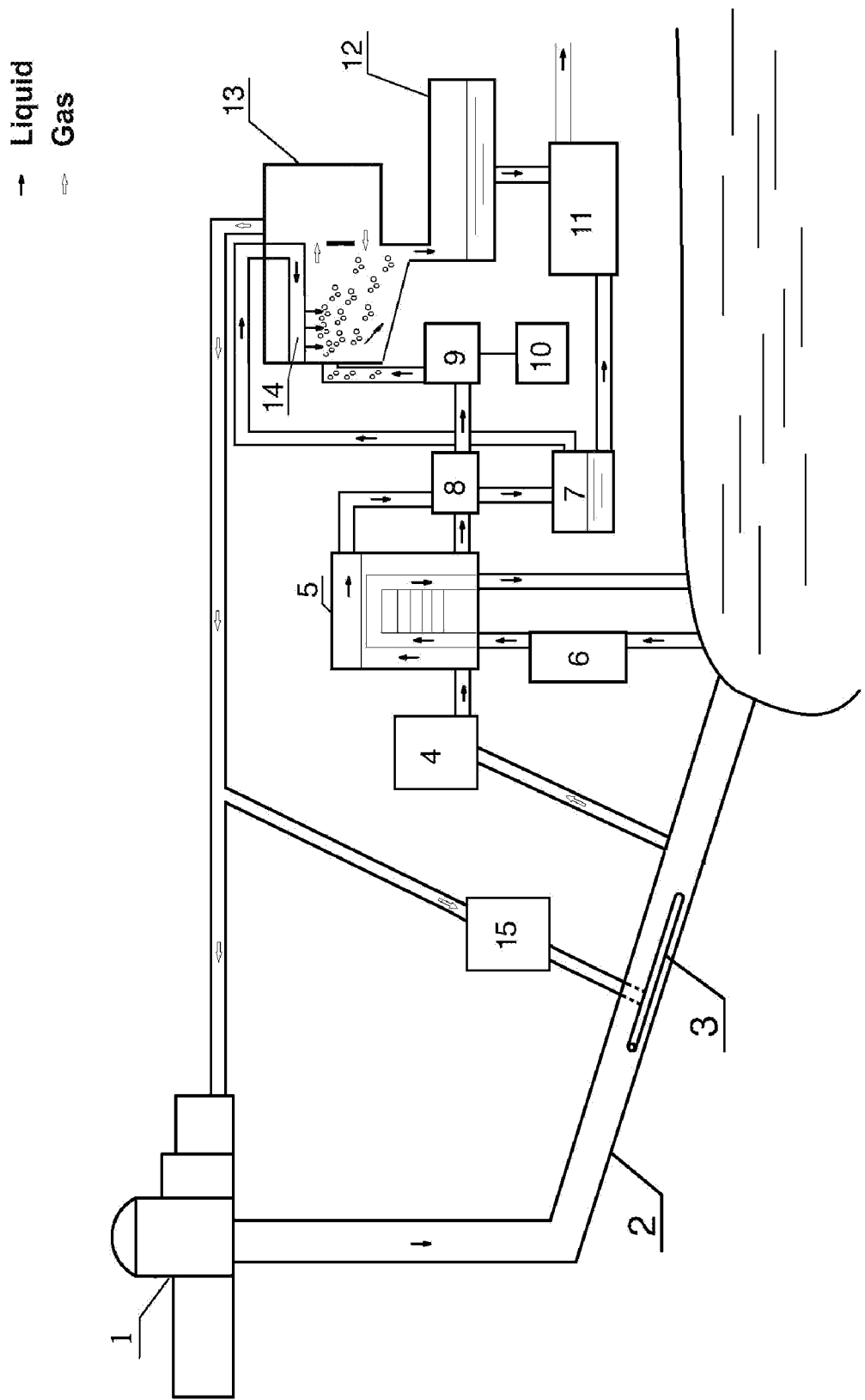
In FIG. 1 is shown a schematic diagram of a preferred embodiment of a waste heat recuperation system of a NPP including a nuclear power plant 1 to which a waste water channel 2 is connected, in the wastewater channel 2 below the water level are arranged bubbling tubes 3 connected to a water chamber 13 by means of a cold air duct, the air part of the wastewater channel 2 is connected by a pressure air duct to a compressor, which is connected to a condenser 5 connected to the pump station of the cooling water 6, the droplet separator 8 and the pool of a primary condensate 7, the droplet separator 8 is connected to the pool of the primary condensate 7 and a turbo expander 9 connected to the electric generator 10 and the water chamber 13. The water chamber 13, containing the sprinkler 14, is connected by an air duct to the nuclear power plant 1, with the bubbling compressor 15 and the pressure pipes—with the pool of the primary condensate 7 and the pool of the secondary condensate 12 which is connected to the pump station of pure water 11, which is also connected to the pool of the primary condensate 7, wherein all of the connections are made by pressure pipes.

The condensate system of the recuperation of the waste energy of NPP preferably is operated as follows. When the nuclear power plant 1 is operated to condense the steam leaving the turbine of the nuclear power plant, cooling water from an external water reservoir is used. In the heat exchange process the cooling water, on passing through the tube bundle of the condenser of the nuclear power plant 1, is heated by 5 to 10° C. to a temperature of approximately 35° C., whereupon it is, via the wastewater channel 2, in which the bubbling tubes 3 are mounted, discharged back to the sea, river, water reservoir or other external waters. To increase the evaporation area, to the bubbling tubes 3 air is supplied, which can be taken from the environment, but in the preferred embodiment of the invention through air ducts the cold dehydrated air is supplied from the water chamber 13 by means of the bubbling compressor 15, and because of this it has a lower temperature and humidity (relative humidity about 20%, air temperature of −4° C. to +8° C.)

than the wastewater. Due to this air bubbles leaving the bubbling tubes 3 and on passing through the volume of the wastewater take the water temperature of the wastewater channel 2 and get saturated with moisture (the moisture content of the vapor in the bubbles reaches 32.3 g/kg or 39 g/m$^3$ of air), and after the bubbles escape to the surface of the water in the wastewater channel 2, they form a moist steam (warm air saturated with water vapor). The bubbling tubes 3 may be made in various versions, for example, in the form of perforated tubes.

After passing along the bubbling tubes 3, the low-temperature wastewater is returned via the wastewater channel 2 to the sea or other external waters, whereas the moist steam is supplied to the compressor 4 via the pressure air duct, the inlet of which is placed in the air part of the wastewater channel 2, and is supplied to the compressor 4, where it is further heated to a temperature above 100° C. due to the adiabatic pressure increase, after which it enters the condenser 5 through the pressure air duct. In condenser 5, heated vapor under pressure is contacted through the walls of heat-exchange tubes/plates with returned water of the thermal net of the NPP and any nearby buildings, or with cold natural water of a nearby water reservoir, or with water taken from the sections of the wastewater channel 2 upstream the bubbling tubes 3, by means of the pumping station of cooling water 6. Due to the difference in the temperatures of the vapor and the seawater on the heat-exchange tubes/plates of the condenser 5, the temperature of the vapor is reduced to temperatures of 10 to 18° C., i.e. below the dew point of the source air, which results in partial deposition on the surfaces of the condenser 5 of moisture, which is then discharged into the pool of the primary condensate 7 and represents a freshwater corresponding in quality to rain water. This process corresponds to the first, the condensation stage of producing freshwater with purification from its salts and impurities. After that, the remaining moist steam under pressure is supplied via the pressure air duct to the droplet separator 8, which may be made, for example, in the form of a slotted-type droplet separator, in which further settling and purification from salt-containing impurities of moisture is carried out, which is then supplied to the pool of the primary condensate 7 and also represents freshwater corresponding to the quality of rain water.

The primary condensate obtained in the first stage of producing freshwater can be used for agricultural irrigation, for technical purposes, as well as, in the preferred embodiment of the invention, in the operation of the condensate system of the recuperation of the power emission of the NPP itself, as will be shown below.

The moist steam remaining after the separation of the primary condensate from the condenser 5 under pressure via the pressure line enters the turbo expander 9 in which it is subjected to an adiabatic expansion with pressure and temperature reduction in the operation of the turbine of the turbo expander 9, whereby the extracted energy is converted into electrical energy by means of an electric current generator 10, which also provides partial recuperation of the energy supplied to compressor 4 for the primary compression of steam. The abrupt adiabatic expansion of the wet vapor in the turbo expander 9 results in the cooling of the vapor to about −10° C. and in the freezing of the moisture, remaining in the wet steam up to this moment, which is the second, cryogenic vapor condensing stage. Frozen moisture containing air and particles of snow and ice enters water chamber 13.

In the sprinkler 14 of the water chamber 13 the frozen-out moisture undergoes the process of sprinkling with warm freshwater, which can be fed to the sprinkler 14 via the pressure pipe from the condenser 5, but in the preferred embodiment of the invention is fed to the sprinkler 14 via the pressure pipe from the pool of the primary condensate 7, or from the pool of the secondary condenser 12, which makes it possible to perform a partial recuperation of the heat of the wastewater of the NPP. As a result of sprinkling, the mixture of air, snow and ice is melted and decomposed into the secondary condensate, which in its quality corresponds to rain water, and in cooled dehydrated air suitable for conditioning of the rooms of the NPP and any nearby buildings, for which purpose pressure ducts connected to the water chamber 13 are used. An important feature of embodiments of the present invention is the connection by means of an air duct of the water chamber 13 with the bubbling tubes 3, which, as shown above, makes it possible due to the high area of evaporation to increase the heat exchange between the pneumatic bubbles with the water of the wastewater channel 2 and thereby to ensure the achievement of the technical result of the present invention, i.e. to ensure a high efficiency of the process of producing freshwater under any conditions due to a recuperation of thermal energy of the wastewater channel 2 of the NPP, to reduce the negative effect of the wastewater on the environment and to increase the overall coefficient of performance of the heat of the NPP. In this, the high-purity secondary condensate is fed via a line to the pool of the secondary condensate 12, whereupon it is possible to use it as technical water, for the irrigation of territories surrounding the NPP, as well as in water supply systems of populated places.

In the case of a utilization of the system for NPP/TPPs having an energy output of less than 1000 MW a utilization of the recuperation system of the energy output without the use of the drop separator 8 becomes advantageous. In this utilization mode the moist steam downstream of the compressor 5 is fed directly to the turbo expander 9, from which it is sent to the water chamber 13, where it is condensed in the second stage by the method disclosed above.

For additional moisture and steam temperature is it possible to use passive floating impellers installed in wastewater channel 2 with a possibility of forming a developed relief of the water surface. In this case, the surface area of the evaporation increases, which increases the humidity and the temperature of the vapor. In this case, in the case of an important (greater than 300 m) length of the wastewater channel 2, it is possible to separately apply the bubbling tubes 3 and the floating impellers at various sections of the wastewater channel 2 with a discharge of steam from each section according to the present invention.

In an embodiment of the invention, the pump station 6 of cooling water can be connected via a pressure line to the wastewater channel 2 below the bubbling tubes 3, but the compressor—above the bubbling tubes 3. This makes it possible to carry out an additional heat exchange between the condenser 5 and the wastewater channel 2, which further reduces the temperature of the wastewater.

Furthermore, according to still another embodiment of the invention, it is possible to connect the condenser 4 and the pump station of the cooling water 6 to an external heat system, for example an urban heating system. In this case, a condensation of steam on condenser 4 will occur with heating of water for the city heating system, which further increases general heat utilization factor of the NPP.

Figure 2:
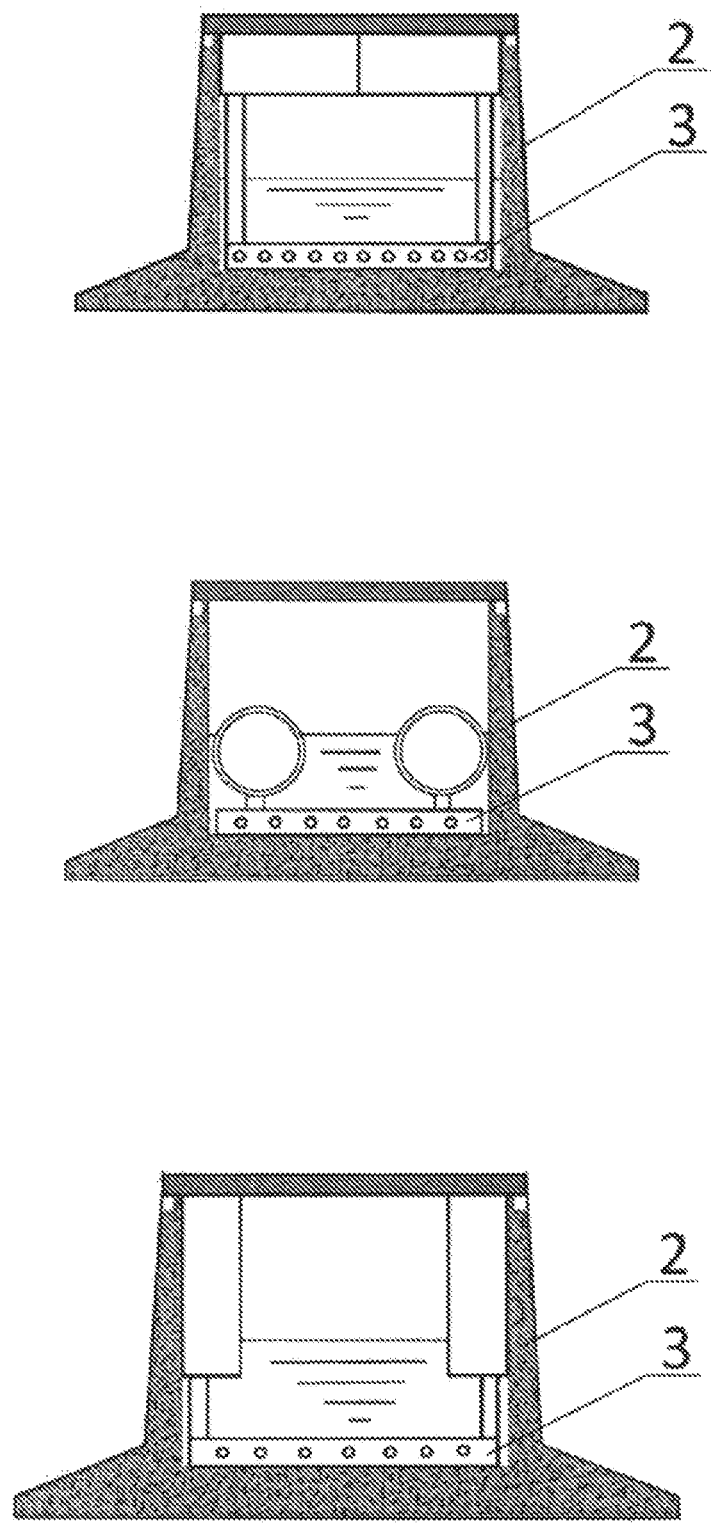
FIG. 2 shows embodiments of the design of the wastewater channel 2 and the placement of air ducts and bubbling tubes 3 therein. When the pipes are partially placed below the surface of the wastewater, the wastewater is further cooled by the cold air flowing through the air duct, and when placed above the surface of the water, it is possible to place below the air ducts grooves which are made with the possibility of collecting condensate and transferring it through pipes outside to the consumer, which improves the productivity of the system.

Calculations show a high application efficiency of the present invention. At the estimated dimensions (FIG. 2) of the wastewater channel 2: width—10 m, height—6 m, length—800 m and depth of the water in the channel—3 m the flow of water in the wastewater channel 2 is 66 t/s. The perforated underwater bubbling tubes (100 tubes, each with a section of 0.07 m$^2$) are located at the bottom (across the axis) of the wastewater channel 2 at a distance of 1 m and more from each other, connecting the main pipes and providing the process of air discharge uniformly in a volume of 400 m$^3$/sec and more. In a preferred embodiment, the wastewater channel 2 be divided into sections of 100 m in length by partitioning grids, which do not interfere with the movement of the water but divide the air space of the wastewater channel 2 into sections. Moist steam is then taken from each section, and the moisture vapor can be supplied to separate condensate stations, each of which is comprises blocks 4-16 of the present invention. To the volume of the discharge water of each section of the wastewater channel 2 by bubbling at a rate of 1000 m/s air is charged from the outlet of the condenser station (relative humidity 20%, air temperature from −4° C. to +8° C.). Air passing as bubbles through the depth of the water of the wastewater channel 2 reaches a value of the temperature of the water (+35° C.), while the moisture content of the vapor reaches a value of 32.3 g/kg or 39 g/m$^3$ (air). The productivity (in freshwater) of one condensate system is more than 3 thousand tons/day. In the case of a wastewater channel with 6 condensate stations of the preferred embodiment of the recuperation of the energy output, a temperature drop of the wastewater by more than 3° C. is reached.

INDUSTRIAL APPLICABILITY

The condensate system of the recuperation of the power discharge of the nuclear power plant makes it possible to substantially increase the efficiency of the process of producing freshwater by recovering the thermal energy of the wastewater of the NPP, to reduce the negative effect of the wastewater on the environment and to increase the overall coefficient of utilization of the heat of the NPP.

The invention claimed is:

1. A condensational energy recuperation system for a nuclear power plant, the system comprising:
   a nuclear power plant comprising a wastewater channel having bubbling tubes arranged below a surface of wastewater in the channel,
   a compressor,
   a condenser,
   a sprinkler;
   a water chamber in which the sprinkler is located,
   an electric generator,
   a pump station of pure water,
   a pump station of cooling water,
   a secondary condensate pool, and
   a turbo expander,
   wherein:
   the compressor is connected to the condenser, the condenser is connected to the turbo expander, the turbo expander drives the electric generator and is connected to the water chamber, the water chamber is connected to the secondary condensate pool, the secondary condensate pool is connected to the pump station of pure water, the condenser is connected to the pump station of cooling water, all of the connections comprising pipes, and
   the compressor is connected to the wastewater channel of the nuclear power plant by a first air duct and the bubbling, tubes are connected to the water chamber by a second air duct.

2. The system according to claim 1, wherein the wastewater channel has an effective total area of not less than 2000 m$^2$ per 100 m of length of the wastewater channel.

3. The system according to claim 1, wherein the system further comprises a droplet separator and a primary condensate pool, and the condenser is connected by a pipe to the droplet separator, the droplet separator is connected to the turbo expander, and the primary condensate pool is connected to the sprinkler of the water chamber and the pump station of pure water.

4. The system according to claim 1, further comprising a bubbling compressor installed in the second air duct.

5. The system according to claim 1, wherein the pump station of the cooling water is connected by a pipe to the wastewater channel below the bubbling tubes, and the compressor is connected by the air duct to the wastewater channel above the bubbling tubes.

6. The system according to claim 3, wherein the pump station of cooling water and the condenser are connected to an external heat system.

7. The system according to claim 1, wherein the sprinkler is connected to the secondary condensate pool by means of a pipe.

* * * * *